United States Patent
Ishikawa

(10) Patent No.: US 12,524,218 B2
(45) Date of Patent: Jan. 13, 2026

(54) CENTER, OTA MASTER, SYSTEM, DISTRIBUTION METHOD, NON-TRANSITORY STORAGE MEDIUM, AND VEHICLE

(71) Applicant: TOYOTA JIDOSHA KABUSHIKI KAISHA, Toyota (JP)

(72) Inventor: Tomoyasu Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 17/657,846

(22) Filed: Apr. 4, 2022

(65) Prior Publication Data
US 2022/0342651 A1 Oct. 27, 2022

(30) Foreign Application Priority Data

Apr. 26, 2021 (JP) .................. 2021-073954

(51) Int. Cl.
| | | |
|---|---|---|
| *G06F 9/44* | (2018.01) | |
| *B60W 50/06* | (2006.01) | |
| *G06F 8/65* | (2018.01) | |
| *G06F 9/445* | (2018.01) | |
| *G06F 9/45* | (2006.01) | |
| *G06F 9/455* | (2018.01) | |

(52) U.S. Cl.
CPC .............. *G06F 8/65* (2013.01); *B60W 50/06* (2013.01); *B60W 2556/45* (2020.02)

(58) Field of Classification Search
CPC ...... G06F 8/65; B60W 50/06; B60W 2556/45
See application file for complete search history.

(56) References Cited

U.S. PATENT DOCUMENTS

| | | | |
|---|---|---|---|
| 10,728,106 B1 * | 7/2020 | Hartley | H04L 41/20 |
| 11,023,223 B2 * | 6/2021 | Ishikawa | H04L 67/12 |
| 11,659,307 B2 * | 5/2023 | Jarrot | H04B 11/00 367/134 |
| 2020/0050378 A1 * | 2/2020 | Sakurai | G06F 8/654 |

(Continued)

FOREIGN PATENT DOCUMENTS

| | | | | |
|---|---|---|---|---|
| CN | 107533491 A | * | 1/2018 | ............. B60R 16/02 |
| CN | 112616090 A | * | 4/2021 | ............... G06F 8/65 |

(Continued)

OTHER PUBLICATIONS

Roland Herberth, Automated Scheduling for Optimal Parallelization to Reduce the Duration of Vehicle Software Updates, 2019, pp. 1-13. https://ieeexplore.ieee.org/stamp/stamp.jsp?tp=&arnumber=8626041 (Year: 2019).*

(Continued)

*Primary Examiner* — Mongbao Nguyen
(74) *Attorney, Agent, or Firm* — Oblon, McClelland, Maier & Neustadt, L.L.P.

(57) ABSTRACT

A center includes: one or more processors configured to transmit, to an over-the-air (OTA) master, update data of software of a plurality of electronic control units mounted on a vehicle and information on an update sequence defining a (Continued)

procedure of processing for updating the software, the OTA master including one or more second processors configured to control an update of the software.

7 Claims, 9 Drawing Sheets

(56) References Cited

U.S. PATENT DOCUMENTS

| | | | | |
|---|---|---|---|---|
| 2020/0183676 | A1* | 6/2020 | Sakurai | H04L 67/34 |
| 2020/0218531 | A1* | 7/2020 | Kushwaha | G06F 8/66 |
| 2020/0307519 | A1* | 10/2020 | Takada | B60R 25/252 |
| 2020/0361413 | A1* | 11/2020 | Ando | G08G 1/202 |
| 2020/0371600 | A1 | 11/2020 | Tellier et al. | |
| 2021/0026617 | A1* | 1/2021 | Maru | G06F 8/65 |
| 2021/0155252 | A1* | 5/2021 | Harata | B60W 50/00 |
| 2021/0157566 | A1* | 5/2021 | Sakurai | G06F 3/0673 |
| 2021/0157572 | A1* | 5/2021 | Harata | G07C 5/0808 |
| 2021/0157575 | A1* | 5/2021 | Ogawa | G06F 21/57 |
| 2022/0012043 | A1* | 1/2022 | Sakurai | H04L 9/3239 |
| 2022/0415097 | A1* | 12/2022 | Kodama | G06F 13/00 |
| 2023/0236822 | A1* | 7/2023 | Liu | B60R 16/0231 |
| 2023/0298399 | A1* | 9/2023 | Fang | H04L 67/125 709/217 |

FOREIGN PATENT DOCUMENTS

| | | | | |
|---|---|---|---|---|
| DE | 102017218872 A1 * | 4/2019 | | G06F 8/65 |
| DE | 102019111402 A1 * | 11/2019 | | B60W 50/14 |
| DE | 102018212214 A1 * | 1/2020 | | G06F 9/4411 |
| EP | 3770754 A1 * | 1/2021 | | G06F 21/577 |
| JP | 2004-326689 A | 11/2004 | | |
| JP | 2011-148398 A | 8/2011 | | |
| JP | 2020-27622 A | 2/2020 | | |
| JP | 2020-27627 A | 2/2020 | | |
| JP | 2020-27629 A | 2/2020 | | |
| JP | 2020027627 A * | 2/2020 | | B60R 16/023 |
| JP | 2021009658 A * | 1/2021 | | B60W 50/00 |
| JP | 2021-22018 A | 2/2021 | | |
| WO | WO 2021/039795 A1 | 3/2021 | | |
| WO | WO-2021039796 A1 * | 3/2021 | | G06F 8/65 |

OTHER PUBLICATIONS

Byungjoo Kim, ECU Software Updating Scenario Using OTA Technology through Mobile Communication Network , 2018, pp. 67-72. https://ieeexplore.ieee.org/stamp/stamp.jsp?tp=&arnumber=8645019 (Year: 2018).*

Harata (JP 2020027627A), 2020, pp. 1-157 (Year: 2020).*

Muhammad Hamza Sarwar, Network of ECUs Software Update in Future vehicles, 2019, pp. 1-5. https://ieeexplore.ieee.org/stamp/stamp.jsp?tp=&arnumber=8895162 (Year: 2019).*

Taehyoung Kim, Compare of Vehicle Management over the Air and On-Board Diagnostics, 2019, pp. 1-2. https://ieeexplore.ieee.org/stamp/stamp.jsp?tp=&arnumber=8986260 (Year: 2019).*

English translation, Maeda (CN 107533491 A), 2018, pp. 1-34. (Year: 2018).*

Byungjoo Kim, ECU Software Updating Scenario Using OTA Technology through Mobile Communication Network, 2018, pp. 1-6 https://ieeexplore.ieee.org/stamp/stamp.jsp?tp=&arnumber=8645019 (Year: 2018).*

Amrita Ghosal, STRIDE: Scalable and Secure Over-The-Air Software Update Scheme for Autonomous Vehicles, 2020, pp. 1-6. https://ieeexplore.ieee.org/stamp/stamp.jsp?tp=&arnumber=9148649 (Year: 2020) (Year: 2020).*

Maru et al. (EP 3770754 A1), 2021, pp. 1-23. (Year: 2021).*

Muller (DE 102018212214 A1), 2020, pp. 1-9. (Year: 2020).*

English translation (DE 102019111402 A1), 2019, pp. 1-30. (Year: 2019).*

Yutaka Onuma, A Method of ECU Software Updating, 2018, pp. 1-6. https://ieeexplore.ieee.org/stamp/stamp.jsp?tp=&arnumber=8343129 (Year: 2018).*

U.S. Appl. No. 17/658,453, filed Apr. 8, 2022, 14 pages.

Partial Translation of Office Action Issued Dec. 20, 2022, in corresponding Japanese Patent Application No. 2021-073954, 7 pages.

Hidetoshi Teraoka et al., "A Study of OTA Update Control Method for Vehicle System Using Lightweight Script Language", Transactions of Information Processing Society of Japan, Consumer Devices & Systems (CDS), (2018), vol. 8, No. 3, 32-42 (with English Abstract).

* cited by examiner

| ECU ID | MEMORY TYPE |
|---|---|
| aaaa | SECOND TYPE (DUAL BANK) |
| bbbb | SECOND TYPE (DUAL BANK) |
| cccc | FIRST TYPE (SINGLE BANK) |
| dddd | FIRST TYPE (SINGLE BANK) |
| ... | |

CENTER, OTA MASTER, SYSTEM, DISTRIBUTION METHOD, NON-TRANSITORY STORAGE MEDIUM, AND VEHICLE

CROSS-REFERENCE TO RELATED APPLICATION

This application claims priority to Japanese Patent Application No. 2021-073954 filed on Apr. 26, 2021, incorporated herein by reference in its entirety.

BACKGROUND

1. Technical Field

The present disclosure relates to a center, an OTA master, a system, a distribution method, a non-transitory storage medium, and a vehicle.

2. Description of Related Art

A plurality of electronic control units (ECUs) used for controlling an operation of a vehicle is mounted on a vehicle. The ECU includes a processor, a non-transitory storage unit, such as a random access memory (RAM), and a non-volatile memory which is a non-volatile storage unit, such as a flash read-only memory (ROM). A control function of the ECU is implemented when the processor executes software stored in the non-volatile memory. Software stored in each ECU is rewritable, and by updating to a newer version of the software, it is possible to improve a function of each ECU or add a new vehicle control function.

As a technology for updating software of an ECU, an over-the-air (OTA) technology is well-known. In the OTA technology, a device that wirelessly connects an in-vehicle communication device connected to an in-vehicle network to a communication network, such as the Internet, and executes software update processing of the vehicle updates or adds the software of the ECU by downloading software from a server via wireless communication and installing the downloaded software on the ECU (see, for example, Japanese Unexamined Patent Application Publication No. 2004-326689.)

SUMMARY

A vehicle has ECUs with various specifications mounted thereon. Examples of such ECUs include an ECU that can independently execute software update processing without being influenced by other ECUs or an ECU that proceeds with the software update processing in cooperation with other ECUs. When a vehicle side determines all the various specifications of the ECUs and executes the software update processing, a burden on a device (an OTA master) that controls the software update on the vehicle side becomes heavy, and thus there is a possibility that the software update processing cannot be suitably executed because, for example, a long time is needed for the software update processing or the number of restricted functions is increased during the update.

The present disclosure provides a center, an OTA master, a center, an OTA master, a system, a distribution method, a non-transitory storage medium, and a vehicle capable of reducing a burden on a device that controls a software update on a vehicle side and suitably executing software update processing of an electronic control unit.

A center according to a first aspect of the present disclosure includes one or more processors configured to transmit, to an over-the-air master, update data of software of a plurality of electronic control units mounted on a vehicle and information on an update sequence defining a procedure of processing for updating the software, the OTA master including one or more second processors configured to control an update of the software.

A center according to a second aspect of the present disclosure includes one or more processors configured to: transmit update data to an over-the-air master configured to transfer the update data to a plurality of electronic control units mounted on a vehicle; and transmit, to the OTA master, information on a sequence of an update based on the update data.

An OTA master according to a third aspect of the present disclosure includes one or more processors configured to receive, from a center, update data of software of a plurality of electronic control units mounted on a vehicle and information on an update sequence defining a procedure of processing updating the software; and control an update of the software of the electronic control units based on the update data of the software and the information on the update sequence.

A system according to a fourth aspect of the present disclosure includes a center including one or more first processors; and an over-the-air master including one or more second processors. The one or more first processors are configured to transmit, to the OTA master, update data of software of a plurality of electronic control units mounted on a vehicle and information on an update sequence defining a procedure of processing for updating the software. The one or more second processors are configured to receive, from the center, the update data of the software and the information on the update sequence, and control an update of the software of the electronic control units based on the update data of the software and the information on the update sequence.

A fifth aspect of the present disclosure is a distribution method executed by a center that includes one or more processor and a memory. The distribution method includes transmitting, to an over-the-air master, update data of software of a plurality of electronic control units mounted on a vehicle and information on an update sequence defining a procedure of processing for updating the software, the OTA master being configured to control an update of the software.

A sixth aspect of the present disclosure is a non-transitory storage medium storing instructions that are executable by a computer of a center that includes one or more processors and a memory, and that cause the computer to execute the method according to the fifth aspect.

A vehicle according to a seventh aspect of the present disclosure includes the OTA master according to the third aspect.

With each aspect of the present disclosure, it is possible to provide a center, an OTA master, a system, a distribution method, a non-transitory storage medium, and a vehicle capable of reducing a burden on a device that controls an update of software on a vehicle side and suitably executing update processing of software of an electronic control unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In a network system used for updating software of an ECU of the present disclosure, a center transmits, to the OTA master, update data of software and information on an update sequence defining a procedure of software update processing. Then, the OTA master controls the update of software of an ECU based on the update data of software and the information on the update sequence received from the center. As such, it is possible to reduce a burden on the OTA master, and suitably execute the software update processing of the ECU. Hereinafter, one embodiment of the present disclosure will be described in detail with reference to drawings.

EMBODIMENTS

System Configuration

Figure 1:
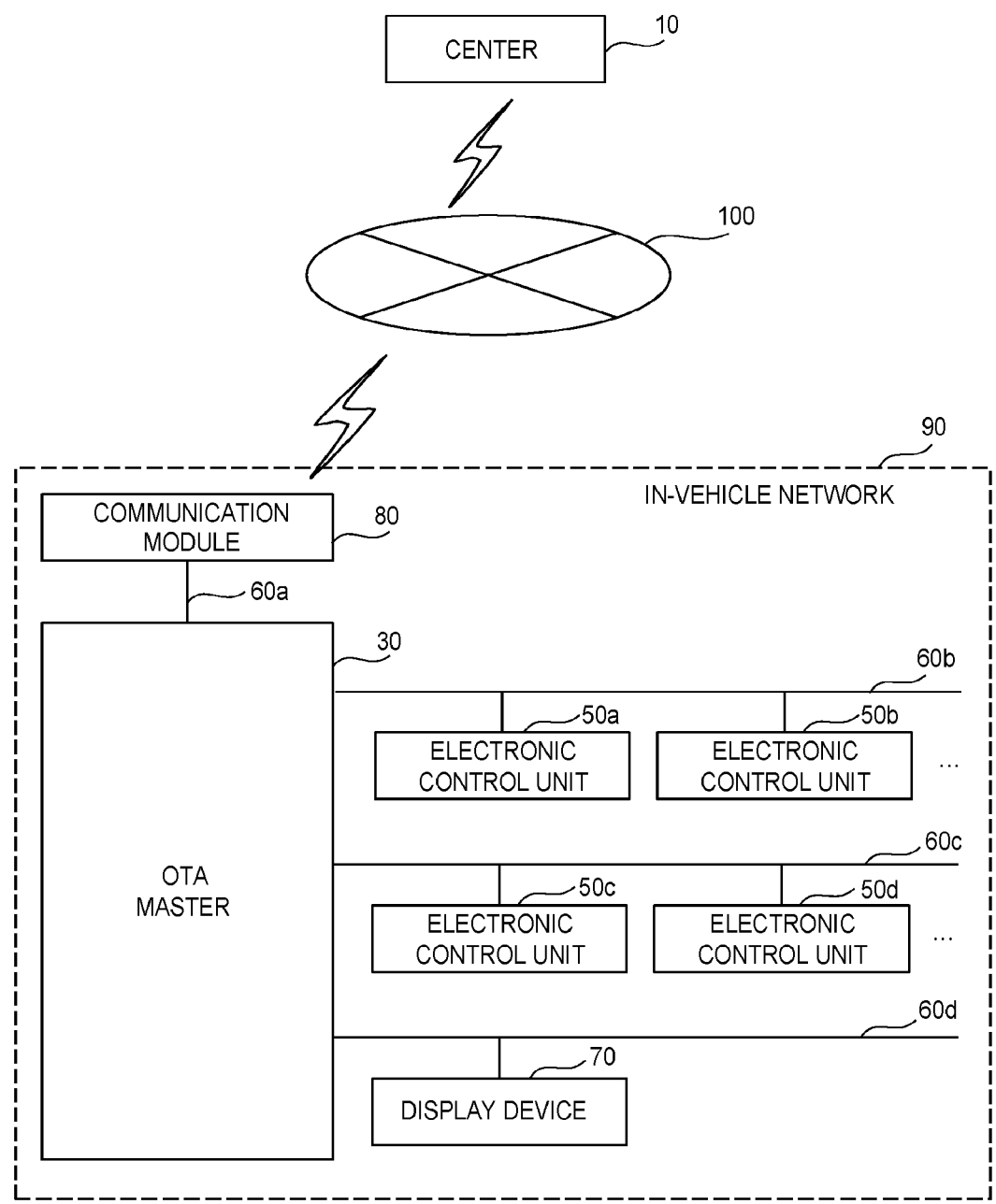
FIG. 1 is a block diagram illustrating an entire configuration of a network system according to an embodiment.

FIG. 1 is a block diagram illustrating an entire configuration of a network system according to an embodiment of the present disclosure. The network system illustrated in FIG. 1 is used for updating software of a plurality of ECUs 50a to 50d mounted on a vehicle, and includes a center 10 outside the vehicle and an in-vehicle network 90 constructed inside the vehicle.

(1) Center

The center 10 communicates with an OTA master 30, described below and included in the in-vehicle network 90 via a network 100, and controls and manages the update data of the software of the ECUs 50a to 50d connected to the OTA master 30 by executing transmission of the update data of the software of the ECUs 50a to 50d and information defining a procedure of update processing, reception of a notification indicating a proceeding situation of the software update processing, or the like. The center 10 functions as a so-called server.

Figure 2:
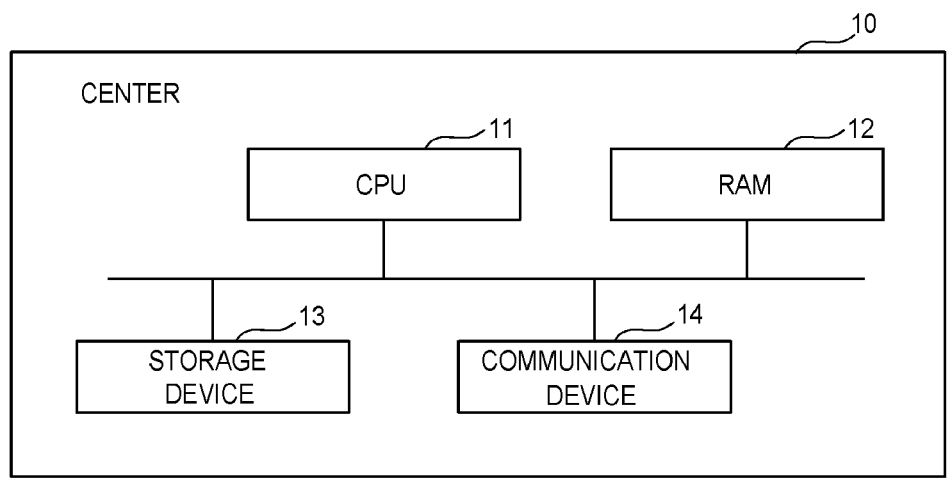
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a RAM 12, a storage device 13, and a communication device 14. The storage device 13 includes a readable and writable storage medium, such as a hard disk drive (HDD) or a solid state drive (SSD), and stores a program used for executing software update management, information used for the software update control and the update management, the update data of the software of each ECU, and the like. At the center 10, the CPU 11 executes predetermined processing for the software update by executing a program read from the storage device 13 using the RAM 12 as a work area. The number of the CPUs 11 is not limited to one. The communication device 14 is used for communicating with the OTA master 30 via the network 100.

Figure 3:
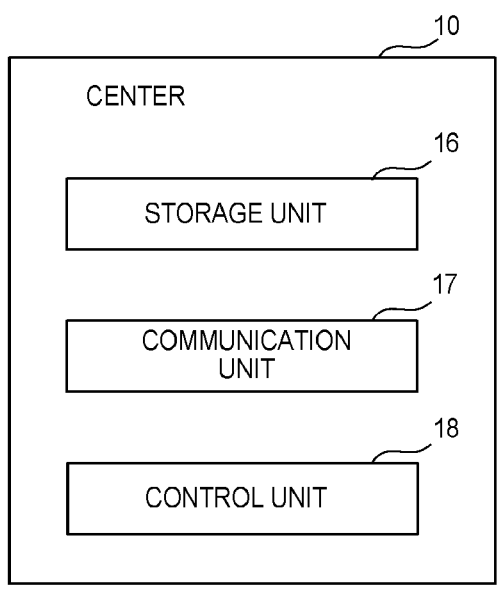
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. The storage unit 16 is implemented by the storage device 13 illustrated in FIG. 2. The communication unit 17 and the control unit 18 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 stores at least update management information that associates information indicating software that can be used by the ECUs 50a to 50d with each piece of vehicle identification information (a vehicle ID) that identifies a vehicle, and the software update data for the ECUs 50a to 50d. As the information indicating the software that can be used by the ECUs 50a to 50d, for example, a combination of latest version information of each piece of the software of the plurality of ECUs 50a to 50d is defined. Further, as the information on the software update processing, the storage unit 16 may store an update status indicating an update state of the software executed in the vehicle. Further, as the information on the software update processing, the storage unit 16 stores the information on the update sequence indicating the procedure of the software update processing used for executing an instruction of control to the OTA master 30. The information on the update sequence is information defining procedures of the software update processing including at least verification of the update data (the update software) of the ECU to be updated, the execution of the installation, and the execution of the activation, respectively. The procedures of the software update processing may be defined for each of (the pieces of software of) the plurality of the ECUs 50a to 50d, or defined for each type of non-volatile memories, described below, of the ECUs 50a to 50d. The information on the update sequence is suitably associated with an ECU_ID, which is a number unique to each ECU used for identifying an ECU, and stored in the storage unit 16.

The communication unit 17 functions as a transmission unit and a receiving unit that transmits and receives data, information, requests, and the like, to and from the OTA master 30. The communication unit 17 receives an update confirmation request of the software from the OTA master 30 (the receiving unit). The update confirmation request may be, for example, information transmitted from the OTA master 30 to the center 10 at a time when a power supply or an ignition is turned on (hereinafter, referred to as "power supply ON") in the vehicle, and is information for requesting the center 10 to confirm whether update data for the ECUs 50a to 50d exists based on vehicle configuration information described below. Further, the communication unit 17 transmits information indicating whether the update data exists to the OTA master 30 in response to the update confirmation request received from the OTA master 30 (the transmission unit). Further, the communication unit 17 receives a transmission request (a download request) for the distribution package from the OTA master 30 (the receiving unit). Further, upon receiving the download request for the distribution package, the communication unit 17 transmits, to the OTA master 30, the distribution package containing the update data of the software and the information on the update sequence of the ECUs 50a to 50d and generated by the control unit 18 described below. In the present embodiment, an example in which one distribution package containing the update data of the software and the information on the update sequence will be described, but the information on the update sequence may be transmitted in a distribution package separate from the distribution package containing the update data of the software, or the distribution package separate therefrom may be transmitted at a separate timing (for example, together with the information indicating whether the update data exists) during the software update processing.

When the communication unit 17 receives the update confirmation request from the OTA master 30, the control unit 18 determines, based on the update management information stored in the storage unit 16, whether the update data of the pieces of software of the ECUs 50a to 50d mounted on the vehicle specified by the vehicle ID, which is included in the update confirmation request, exists. The determination result of whether the update data exists by the control unit 18 is transmitted to the OTA master 30 by the communication unit 17. Upon determining that the update data of the software of the ECUs 50a to 50d exists and receiving the download request for the distribution package from the OTA master 30, the control unit 18 generates the distribution package containing the update data and the information on the update sequence that are stored in the storage unit 16.

(2) In-Vehicle Network

The in-vehicle network 90 includes the OTA master 30, the plurality of ECUs 50a to 50d, a display device 70, and a communication module 80. The OTA master 30 is connected to the communication module 80 via a bus 60a, connected to the ECUs 50a, 50b via a bus 60b, and connected to the ECUs 50c, 50d via a bus 60c. The OTA master 30 is connected to the display device 70 via a bus 60d.

The OTA master 30 can wirelessly communicate with the center 10 via the bus 60a and the communication module 80 by way of the network 100. Further, the OTA master 30 can communicate with the ECUs 50a to 50d and the display device 70 via the buses 60b to 60d in a wired manner. The OTA master 30 has functions of managing an OTA state and executing the update of software of an ECU which is a target of the software update (hereinafter also referred to as a "target ECU") by controlling the update sequence, which is a flow of the software update processing. The OTA master 30 controls the update the software of the target ECU from among the ECUs 50a to 50d based on the update data, the information on the update sequence, and the like that are acquired from the center 10. The OTA master 30 may also be referred to as a central gateway (CGW).

Figure 4:
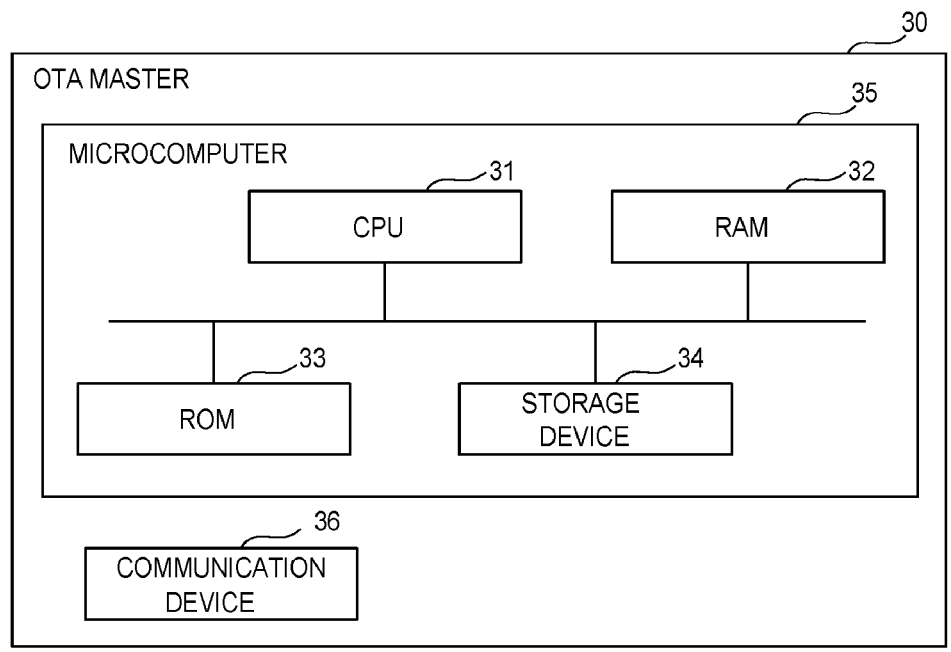
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, a RAM 32, a Read-Only Memory (ROM) 33, a storage device 34, and a communication device 36. The CPU 31, the RAM 32, the ROM 33, and the storage device 34 compose a microcomputer 35. In the OTA master 30, the CPU 31 executes predetermined processing for the software update by executing a program read from the ROM 33 using the RAM 32 as a work area. The number of the CPUs 31 is not limited to one. The communication device 36 is used for communicating with each of the communication module 80, the ECUs 50a to 50d, and the display device 70 via the buses 60a to 60d illustrated in FIG. 1.

Figure 5:
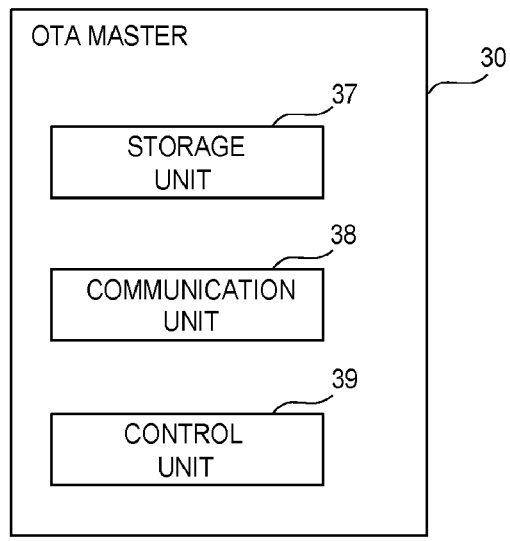
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. The storage unit 37 is implemented by the storage device 34 illustrated in FIG. 4. The communication unit 38 and the control unit 39 are implemented when the CPU 31 illustrated in FIG. 4 executes a program stored in the ROM 33 using the RAM 32.

In addition to a program (a control program of the OTA master 30) for updating the pieces of software of the plurality of ECUs 50a to 50d or various pieces of data used when updating the pieces of software, the storage unit 37 stores the software update data, the information on the update sequence, and the like that are downloaded from the center 10. Further, the storage unit 37 stores the information (described below) on the types of the non-volatile memories mounted on the plurality of ECUs 50a to 50d, respectively.

The communication unit 38 functions as a transmission unit and a receiving unit that transmits and receives data, information, requests, and the like to and from the center 10. The communication unit 38 transmits the update confirmation request of the software to the center 10 at, for example, the time of power supply ON of the vehicle (the transmission unit). The update confirmation request includes, for example, a vehicle ID for identifying the vehicle and the information on the current versions of the pieces of software of the ECUs 50a to 50d connected to the in-vehicle network 90. The vehicle ID and the current versions of the pieces of software of the ECUs 50a to 50d are used for determining whether the update data of the software of the ECUs 50a to 50d exists by comparing with the latest software version held by the center 10 for each vehicle ID. Further, as a response to the update confirmation request, the communication unit 38 receives a notification indicating whether the update data exists from the center 10 (the receiving unit). When the update data of the pieces of software of the ECUs 50a to 50d exists, the communication unit 38 transmits, to the center 10, a download request for the distribution package containing the update data of the software and the information on the update sequence (the transmission unit), and receives (downloads) the distribution package transmitted from the center 10 (the receiving unit). Further, the communication unit 38 transmits, to the center 10, the update state of the software transmitted by the ECUs 50a to 50d (the transmission unit).

The control unit 39 determines whether the update data of the pieces of software of the ECUs 50a to 50d exists based on the response to the update confirmation request received by the communication unit 38 from the center 10. Further, the control unit 39 verifies authenticity of the distribution package received (downloaded) by the communication unit 38 from the center 10 and stored in the storage unit 37. Further, the control unit 39 controls the software update processing (various types of verification, the installation, the activation, and the like) for the ECUs 50a to 50d based on the information on the update sequence, using the update data received (downloaded) from the center 10. Specifically, the control unit 39 transfers one or more pieces of update data downloaded as the distribution package to the target ECU and causes the target ECU to install the update software based on the update data. After the completion of the installation, the control unit 39 gives the target ECU an instruction on activation that makes the installed update software active. At the time of the software update processing, the control unit 39 suitably controls procedures of the various types of verification, the installation, the activation, and the like for the plurality of ECUs 50a to 50d based on the information on the update sequence.

The plurality of ECUs 50a to 50d are devices used for controlling the operation of each part of the vehicle. In FIG. 1, an example where the in-vehicle network 90 includes four ECUs 50a to 50d is illustrated, but the number of ECUs is not particularly limited. Further, the number of buses connecting the ECUs 50a to 50d to the OTA master 30 is not particularly limited, either. Examples of schematic configurations of the ECUs 50a to 50d are illustrated in FIGS. 6A and 6B.

Figure 6A:
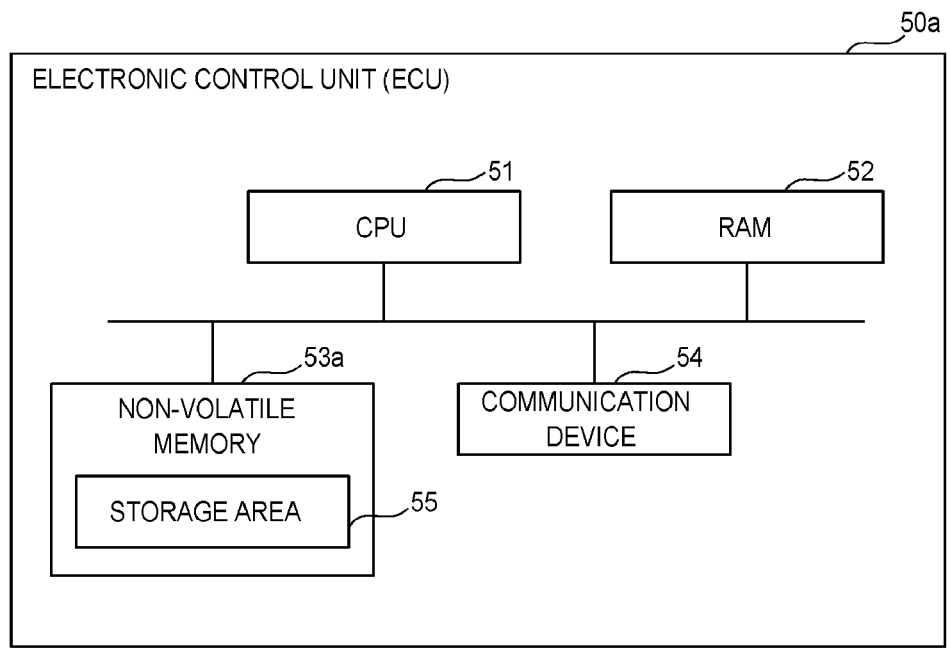
FIG. 6A is a block diagram illustrating an example of a schematic configuration of an ECU.

The ECU 50a illustrated in FIG. 6A includes a CPU 51, a RAM 52, a non-volatile memory 53a, and a communication device 54. The CPU 51 implements a function of the ECU 50a by executing a program read from the non-volatile memory 53a using the RAM 52 as a work area. The non-volatile memory 53a is a memory (hereinafter referred to as "a single-bank memory") having one storage area (bank) 55 used for storing data, such as software. In the present embodiment, a memory type of the non-volatile memory 53a, which is a single-bank memory, may be stated as a "first type" to distinguish it from others. In addition to the software used for implementing the function of the ECU 50a, the storage area 55 may store version information, parameter data, a program for booting, a program for updating software, or the like. The communication device 54 is a device used for communicating with other ECUs 50b to 50d connected to the OTA master 30 or the in-vehicle network 90.

Figure 6B:
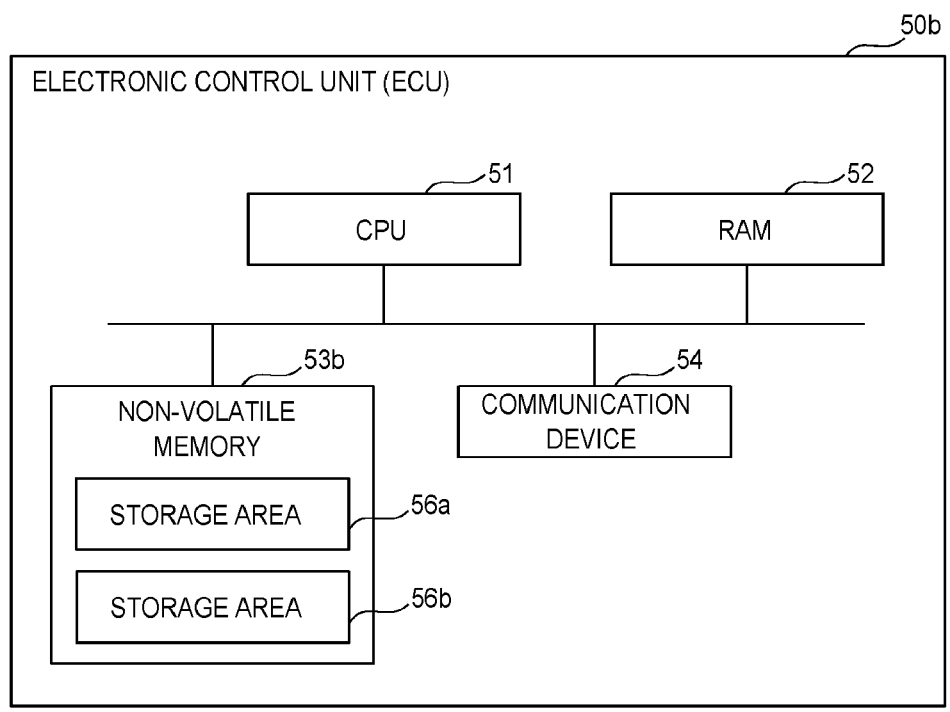
FIG. 6B is a block diagram illustrating another example of the schematic configuration of the ECU.

In the same manner as the ECU 50a, the ECU 50b illustrated in FIG. 6B includes a CPU 51, a RANI 52, a non-volatile memory 53b, and a communication device 54. However, the non-volatile memory 53b mounted on the ECU 50b is a memory (hereinafter referred to as "a dual-bank memory") having two storage areas (banks) 56a, 56b used for storing data, such as software. In the present embodiment, a memory type of the non-volatile memory 53b, which is a dual-bank memory, may be stated as a "second type" to distinguish it from others. In addition to the software used for implementing a function of the ECU 50b, the storage areas 56a, 56b may store version information, parameter data, a program for booting, a program for updating software, or the like. The CPU 51 of the ECU 50b uses any one of the two storage areas 56a, 56b of the non-volatile memory 53b as the storage area to be read (an active bank), and implements the software stored in the storage area to be read. In the other storage area that is not to be read (an inactive bank, a write bank), the update software (an updated version program) can be installed (written) based on the update data in a background while the program in the storage area to be read (the active bank) is being executed. In the software update processing, at the time of executing activation (making the update software active), the update software is activated by switching the storage area from which the program is read by the CPU 51 of the ECU 50b.

As a specific example, it is assumed that the current software is stored in the storage area 56a of the non-volatile memory 53b, which is a dual-bank memory, and the update software is installed in the storage area 56b. Upon receiving an instruction on activating the update software from the OTA master 30, the ECU 50b can switch the storage area (the active bank) to be read of the CPU 51 by switching, for example, a read start address of the CPU 51 from a head address of the storage area 56a to an head address of the storage area 56b, and executes the update software installed in the storage area 56b. In the present disclosure, a configuration of the non-volatile memory referred to as a "single-bank suspension memory" in which one storage area is pseudo-divided into two banks, and a program can be written on the one bank while the program stored on the other bank is being executed is also classified as the second type of memory.

Figures 7, 8:
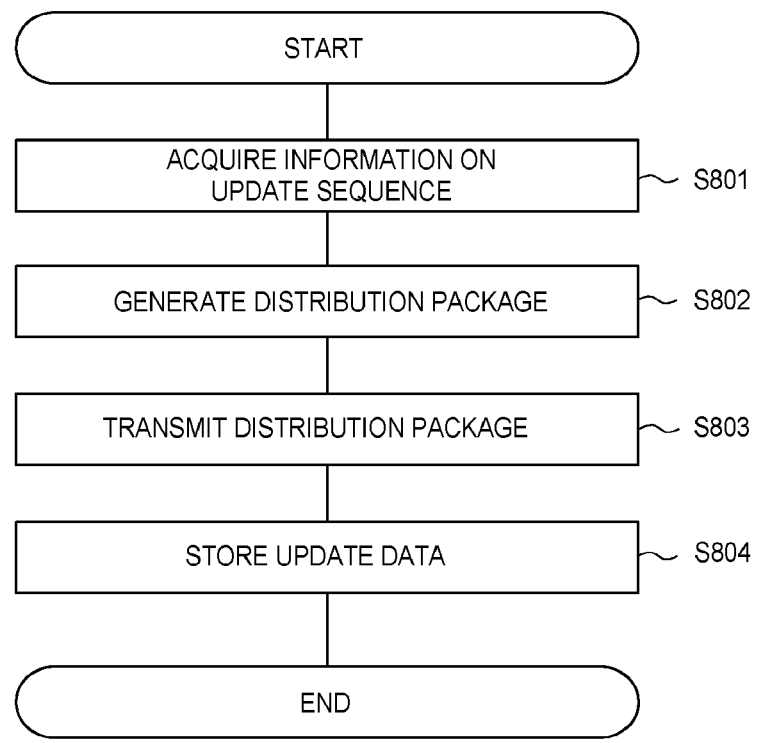
FIG. 7 is a diagram illustrating an example of type information.
FIG. 8 is a flowchart of a procedure of download processing executed by the center and the OTA master.

FIG. 7 illustrates an example of type information, which is information on a type of the non-volatile memory mounted on each of the plurality of ECUs 50a to 50d. In the type information exemplified in FIG. 7, an ECU_ID, which is a number used for identifying the ECU, is associated with the type (the first type (the single bank)/or the second type (the dual bank)) of the non-volatile memory mounted on the ECU. The type information is stored in one or both of the storage unit 37 of the OTA master 30 and the storage unit 16 of the center 10, and managed. The type information may be generated in advance based on specifications of the ECUs 50a to 50d composing the in-vehicle network 90 and stored in the storage unit 37 at the time of manufacturing the vehicle and the like. Alternatively, the type information may be acquired by communication inside the in-vehicle network 90 from the target ECU at the time of executing the software update processing. Further, when the type information is managed by the center 10, the OTA master 30 may acquire the type information from the center 10 via the network 100.

The display device 70 is a human-machine interface (HMI) used for executing various displays, such as a display representing that the update data exists at the time of executing the software update processing of the ECUs 50a to 50d, a display of an approval request screen for requesting approval for the software update from a user or a manager of the vehicle, and a display of a result of the software update. As the display device 70, a display device of a car navigation system is typically used, but the display device 70 is not particularly limited as long as it can display information needed at the time of the software update processing. In addition to the display device 70, an ECU and the like may be further connected to the bus 60d illustrated in FIG. 1.

The communication module 80 is a unit having a function of controlling communication between the center 10 and the vehicle, and is a communication device used for connecting the in-vehicle network 90 to the center 10. The communication module 80 is wirelessly connected to the center 10 by way of the network 100, and the OTA master 30 executes vehicle authentication, downloading of the update data, or the like. The communication module 80 may be included in the OTA master 30.

Overview of Software Update Processing

At, for example, the time of the power supply ON the power supply of the vehicle is turned on, the OTA master 30 transmits the update confirmation request of the software to the center 10. The update confirmation request includes a vehicle ID used for identifying the vehicle and vehicle configuration information, which is information on a state of an ECU (a system configuration) such as current versions of hardware and the software of the ECUs 50a to 50d connected to the in-vehicle network 90, and the like. The vehicle configuration information can be generated by acquiring identification numbers (ECU_ID) of the ECUs and identification numbers of the software versions (ECU_Software_ID) of the ECUs from the ECUs 50a to 50d connected to the in-vehicle network 90. The vehicle ID and the current versions of the software of the ECUs 50a to 50d are used for determining whether the update data of the software of the ECUs 50a to 50d exists by comparing them with the latest software version held by the center 10 for each vehicle ID. As a response to the update confirmation request received from the OTA master 30, the center 10 transmits a notification indicating whether the update data exists to the OTA master 30. When the update data of the pieces of software of the ECUs 50a to 50d exists, the OTA master 30 transmits, to the center 10, the download request for the distribution package. In response to the download request received from the OTA master 30, the center 10 transmits, to the OTA master 30, the distribution package containing the update data and the information on the update sequence (procedures of various types of verification, the installation, the activation, and the like). In addition to the update data and the information on the update sequence, the distribution package may contain verification data for verifying the authenticity of the update data, the number of pieces of update data, type information, various pieces of control information used at the time of the software update, or the like.

The OTA master 30 determines whether the update data of the pieces of software of the ECUs 50a to 50d exists based on the response to the update confirmation request received from the center 10. Further, the OTA master 30 verifies the authenticity of the distribution package received from the center 10 and stored in the storage device 13. Further, based on the information on the update sequence contained in the distribution package, the OTA master 30 transfers one or more pieces of update data downloaded in the distribution package to the target ECU and causes the target ECU to install the update data (the update software). After the completion of the installation, based on the information on the update sequence contained in the distribution package, the OTA master 30 gives the target ECU an instruction on activation that makes the installed update software active.

Further, in approval request processing, the OTA master 30 causes an output device to output a notification indicating that the approval for the software update is required or a notification prompting an input indicating that the software update has been approved. As the output device, a display device 70 provided on the in-vehicle network 90, a voice output device (not shown) that outputs a notification by voice, or the like, may be used. For example, in the approval request processing, when the display device 70 is used as the output device, the OTA master 30 may cause the display device 70 to display an approval request screen used for requesting the approval for the software update from the user or the manager, and cause the display unit 70 to display a notification prompting a specific input operation, such as pressing of an approval button in the case where the user or the manager approves the request. Alternatively, in the approval request processing, the OTA master 30 may cause the display device 70 to display text, an icon, or the like, notifying that the update data of the pieces of software of the ECUs 50a to 50d exists, or cause the display device 70 to display restrictions and the like during the execution of the software update processing. Upon receiving the input indicating that the request has been approved from the user or the manager, the OTA master 30 executes control processing of the above-described installation and activation, and updates the software of the target ECU.

Here, when the non-volatile memory of the target ECU is the single-bank memory, in principle, approval request processing for the software update is executed before the execution of the installation because the installation and the activation are consecutively executed. Even for the target ECU of the single-bank memory, depending on the information on the update sequence instructed from the center 10, it is possibly needed that the update processing is temporarily stopped, that is, the activation may be suspended (stand-by) when the installation is in a state of completion. Further, when the non-volatile memory of the target ECU is the dual-bank memory, the approval request processing for the software update is executed at least after the execution of the installation and before the execution of the activation. When the non-volatile memory of the target ECU is the dual-bank memory, the approval request processing for the software update before the execution of the installation may be executed or omitted.

The software update processing is composed of a phase in which the OTA master 30 downloads the update data and the information on the update sequence from the center 10 (a download phase), a phase in which the OTA master 30 transfers the downloaded update data to the target ECU based on the information on the update sequence, and installs the update software based on the update data in the storage area of the target ECU (an installation phase), and a phase in which the target ECU makes the installed update software active based on the information on the update sequence (an activation phase).

The download is processing in which the OTA master 30 receives, from the center 10, the update data for updating the software of the ECU transmitted in the distribution package and stores it in the storage unit 37. Regarding reception of the update data by downloading, the update data for the ECU having the second type of non-volatile memory (the dual-bank memory) mounted thereon, which has a relatively low probability of update failure, may be prioritized and received with prioritizing it, or the update data for the ECU having the first type of non-volatile memory (the single-bank memory) mounted thereon and the update data for the ECU having the second type of non-volatile memory (the dual-bank memory) mounted thereon may be received without prioritizing any of them. The download phase includes not only the execution of the download, but also controls of a series of processes associated with the download, such as determining whether the download can be executed and verification of the update data.

The update data transmitted from the center 10 to the OTA master 30 may include any of the update software of the ECU (total data or difference data), the compressed data obtained by compressing the update software, and the divided data obtained by dividing the update software or the compressed data. Further, the update data may include the ECU_ID of the target ECU (or the serial number) and an ECU_Software_ID of the target ECU before the update. The update data is downloaded as the above-described distribution package, but the distribution package includes the update data for a single ECU or a plurality of ECUs.

The installation is processing in which the OTA master 30 writes, according to a determined procedure, the update software (the updated version program) on the non-volatile memory 53a and/or the non-volatile memory 53b of the plurality of target ECUs, based on the update data and the information on the update sequence downloaded from the center 10. The installation phase includes not only the execution of the installation, but also controls of a series of processes associated with the installation, such as determining whether the installation can be executed, transference of the update data, and the verification of the update software.

When the update data includes the update software itself (the total data), in the installation phase, the OTA master 30 transfers the update data (the update software) to the target ECU. Further, when the update data includes the compressed data of the update software, difference data, or divided data, the OTA master 30 may transfer the update data to the target ECU and the target ECU may generate the update software from the update data, or the OTA master 30 may generate the update software from the update data and then transfer the update software to the target ECU. Here, the update software may be generated by decompressing the compressed data or assembling (integrating) the difference data or the divided data.

The update software is installed by the target ECU based on a request for the installation from the OTA master 30, which is based on the information on the update sequence acquired from the center 10. The specific target ECU that has received the update data may autonomously execute the installation without receiving an explicit instruction from the OTA master 30.

The activation is processing in which the target ECU makes (activates) the update software installed on the non-volatile memory 53a and/or the non-volatile memory 53b active. The activation phase includes not only the execution of the activation but also a series of controls associated with the activation, such as determining whether the activation can be executed, the approval request for the activation to the user or the manager of the vehicle, verification of the execution results.

The update software is activated by the target ECU based on a request for the activation from the OTA master 30, which is based on the information on the update sequence acquired from the center 10. The specific target ECU that has received the update data may autonomously activate after the completion of the installation without receiving an explicit instruction from the OTA master 30.

The software update processing may be executed continuously or in parallel to each of the plurality of target ECUs.

Further, the "software update processing" in the present specification includes not only processing for continuously executing all of the download, installation, and activation, but also processing for executing only a part of the download, installation, and activation.
Processing Next, specific examples of the software update processing executed in the network system according to the present embodiment will be described with further reference to FIGS. 8, 9A, 9B, 10A, and 10B.
(1) Specific Example of Download FIG. 8 is a flowchart describing a procedure of the download processing executed by the center 10 and the OTA master 30 according to specific examples. The download illustrated in FIG. 8 is started when the center 10 receives a download request for the distribution package from the OTA master 30.

(Step S801) The center 10 acquires information on the update sequence of the target ECU of which the software is to be updated. This acquisition may be executed when the center 10 is provided with the information on the update sequence from a vehicle manufacturer (OEM), or may be executed when the center 10 self-generates the information on the update sequence based on various pieces of information given from the OEM or the vehicle. When the information on the update sequence is acquired, the process proceeds to step S802.

(Step S802) The center 10 generates a distribution package containing the update data of the target ECU, the information on the update sequence, and the like. The update data of the target ECU is provided in advance from the OEM and the like. When the distribution package is generated, the process proceeds to step S802.

(Step S803) The center 10 transmits the generated distribution package to the OTA master 30. When the distribution package is transmitted, the process proceeds to step S804.

(Step S804) The OTA master 30 stores, in the storage unit 37, the update data and the like contained in the distribution package received from the center 10. As such, the download processing ends.

In the specific example of the distribution processing, the center 10 transmits, to the OTA master 30, the distribution package containing the update data of the target ECU and the information on the update sequence. By this processing, the OTA master 30 can execute the update processing of each target ECU according to the procedure of the software update processing defined by the information on the update sequence given from the center 10. In the information on the update sequence, for example, it is possible to individually give the target ECUs an instruction on an update procedure suitable to each of them, and give an instruction on an update procedure between each other to a plurality of target ECUs that require a cooperative operation. Therefore, the OTA master 30 can easily execute the update processing suitable for the target ECU based on the information on the update sequence without grasping and managing the functions, relationships, or the like of the plurality of target ECUs on its own, and thus a processing load on the OTA master 30 is reduced.

As the information on the update sequence, the procedure for the software update processing for all target ECUs does not have to be transmitted to the OTA master 30 every time. For example, for a target ECU of which software update processing is always the same without being influenced by other target ECUs, the information on the update sequence may be defined by being included in the information on the update sequence only when a first distribution package is generated. The OTA master 30 stores, in the storage unit 37, a part or all of the information on the update sequence transmitted in the first distribution package, reads out the information needed for next software update processing from the storage unit 37 and uses it.

(2) Specific Example 1 of Installation and Activation

Figure 9A:
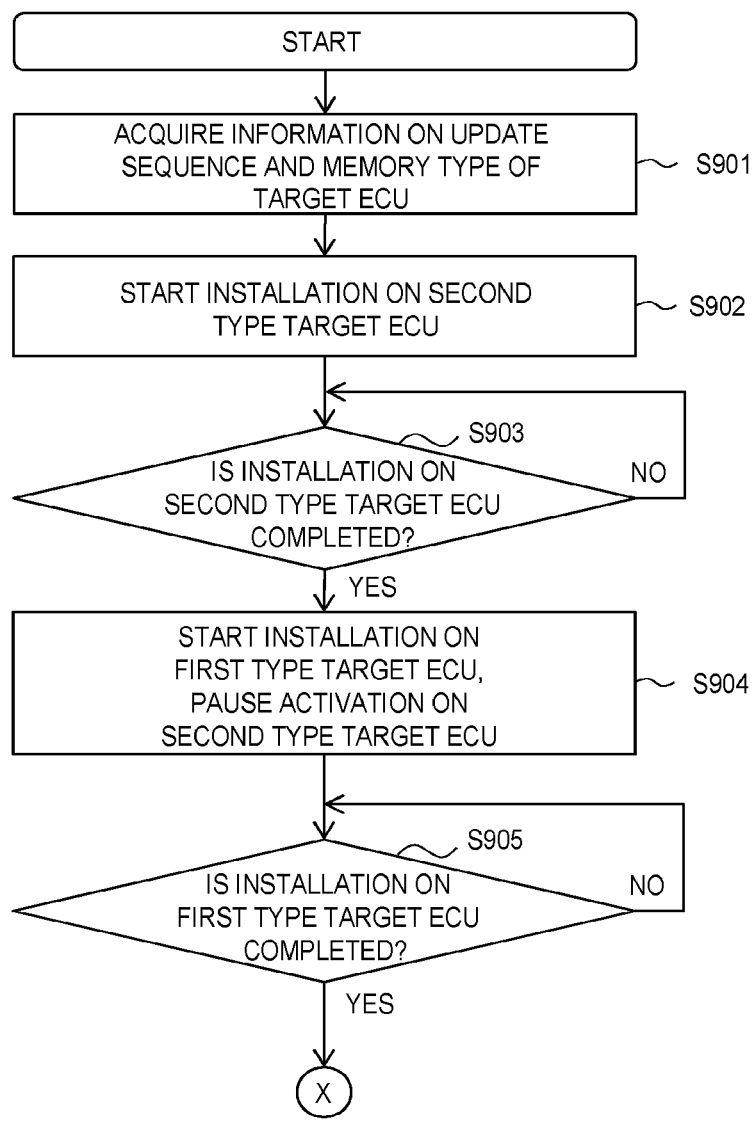
FIG. 9A is a flowchart of procedures of installation and activation processing according to a specific example 1 executed by the OTA master and a target ECU.
Figure 9B:
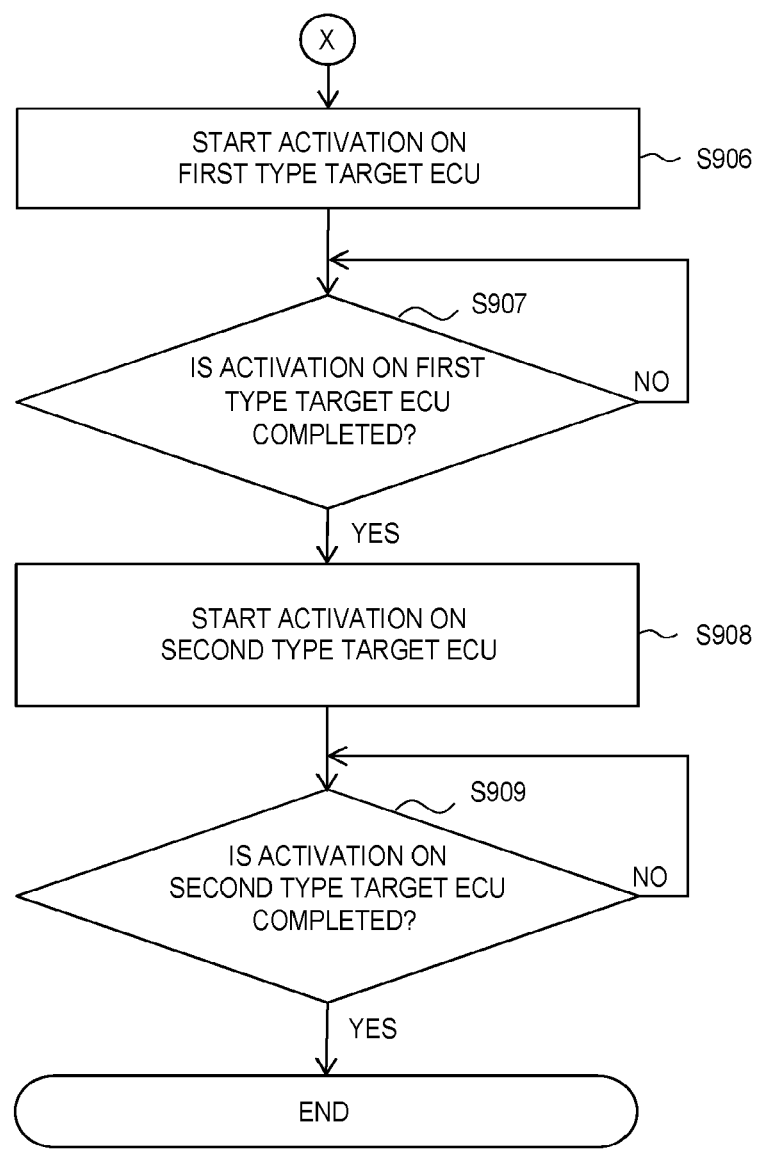
FIG. 9B is another flowchart of the procedures of the installation and the activation processing according to the specific example 1 executed by the OTA master and the target ECU.

FIGS. 9A and 9B are flowcharts describing procedures of installation and activation processing executed by the OTA master 30 and the target ECU according to a specific example 1. The processing of FIG. 9A and the processing of FIG. 9B are connected by a combiner X.

In the specific example 1 illustrated in FIGS. 9A and 9B, an example of the information on the update sequence received by the OTA master 30 from the center 10 is described. In the example, the content in which the installation of the update software in the target ECU (hereinafter, referred to as a "second type of target ECU") having a second type of non-volatile memory (the dual-bank memory) mounted thereon is prioritized over the installation of the update software in the target ECU (hereinafter, referred to as a "first type of target ECU") having a first type of non-volatile memory (the single-bank memory) mounted thereon is defined.

As the information on the update sequence of the specific example 1, the procedure of the software update processing for the first type target ECU, "verify the update data→pause→install→activate"; and the procedure of the software update processing for the second type target ECU, "verify the update data→install→pause→activate", are exemplified. Further, in addition to defining the procedure of the software update processing for each of the first type of target ECU and the second type of target ECU, the information on the update sequence may be information for giving an instruction on a relative priority in the procedure of the processing between the plurality of target ECUs, such as "verify each update data→install the second type of target ECU→install the first type of target ECU→activate the first type of target ECU→activate the second type of target ECU".

The processing of the specific example 1 is started after the OTA master 30 completes the download of the distribution package containing the update data of the target ECU and the information on the update sequence, and when predetermined conditions (a possibility of the execution of the installation, OK in verification of the update data, and the like) are satisfied.

(Step S901) The OTA master 30 acquires the information on the update sequence contained in the distribution package and the type (the first type/the second type) of the non-volatile memory mounted on the target ECU. This memory type may be acquired by referring to the type information (FIG. 7) stored in the storage unit 37 when the OTA master 30 manages the memory type, and by referring to the information of the memory type that is contained in the distribution package and transmitted when the center 10 manages the memory type. When the information on the update sequence and the memory type of the target ECU are acquired, the process proceeds to step S902.

(Step S902) The OTA master 30 and the second type of target ECU start the installation, which is processing for writing the update software on the storage area of the non-volatile memory of the second type of target ECU, based on the update data and the information on the update sequence. The information on the update sequence of the specific example 1 defines the procedure of "verify the update data→pause" for the first type of target ECU, and the procedure of "verify the update data→install" for the second type of target ECU, respectively. In accordance with these procedures, after the verification of each update data is executed, the installation is started with prioritizing the update software in the second type of target ECU over the update software in the first type of target ECU. The installation is started all at once or in a predetermined order for all the second type of target ECUs. When the installation for the second type of target ECU is started, the process proceeds to step S903.

(Step S903) The OTA master 30 determines whether the installation of the update software in the second type of target ECU is completed. The completion of the installation may be determined for all the second type of target ECUs, or only for some second type of target ECUs determined in advance. The OTA master 30 may determine the completion of the installation based on a completion notification from the second type of target ECU or after a predetermined time has elapsed from the start of the installation. The predetermined time may be set, for example, to be equal to or longer than a maximum time needed for each installation. When it is determined that the installation of the update software in the second type of target ECU is completed (step S903, yes), the process proceeds to step S904.

(Step S904) The OTA master 30 and the first type of target ECU start the installation, which is the processing for writing the update software on the storage area of the non-volatile memory of the first type of target ECU, based on the update data and the information on the update sequence. On the other hand, the OTA master 30 and the second type of target ECU pause the activation, which is processing for making active the update software written on the storage area of the non-volatile memory of the second type of target ECU, based on the information on the update sequence. The information on the update sequence in the specific example 1 defines the procedure of "pause install" for the first type of target ECU, and the procedure of "install→pause" for the second type of target ECU, respectively. In accordance with these procedures, after the installation of the update software for the second type target ECU is executed, the start of the installation for the update software of the first type of target ECU is prioritized over the activation of the update software of the second type of target ECU. The installation is started all at once or in a predetermined order for all the first type of target ECUs. When the installation for the first type of target ECU is started, the process proceeds to step S905.

(Step S905) The OTA master 30 determines whether the installation of the update software of the first type of target ECU is completed. The completion of the installation is determined for all the first type of target ECUs. The OTA master 30 may determine the completion of the installation based on a completion notification from the first type of target ECU or after a predetermined time has elapsed from the start of the installation. The predetermined time may be set, for example, to be equal to or longer than a maximum time needed for each installation. When it is determined that the installation of the update software in the first type of target ECU is completed (step S905, yes), the process proceeds to step S906.

(Step S906) The OTA master 30 and the first type of target ECU start the activation, which is the processing for making active the update software written on the storage area of the non-volatile memory of the first type of target ECU. The information on the update sequence in the specific example 1 defines the procedure of "install activate" for the first type of target ECU, and the procedure of "pause activate" for the second type of target ECU, respectively. In accordance with these procedures, after the installation of the update software for the first type of target ECU is executed, the start of the activation for the update software of the first type of target ECU is prioritized over the activation of the update software of the second type of target ECU. The activation is started all at once or in a predetermined order for all the first type of target ECUs. When the activation for the first type of target ECU is started, the process proceeds to step S907.

(Step S907) The OTA master 30 determines whether the activation of the update software of the first type of target ECU is completed. The completion of the activation is determined for all the first type of target ECUs. The OTA master 30 may determine the completion of the activation based on a completion notification from the first type of target ECU or after a predetermined time has elapsed from the start of the activation. The predetermined time may be set, for example, to be equal to or longer than a maximum time needed for each activation. When it is determined that the activation of the update software of the first type of target ECU is completed (step S907, yes), the process proceeds to step S908.

(Step S908) The OTA master 30 and the second type of target ECU start the activation, which is the processing for making active the update software written on the storage area of the non-volatile memory of the second type of target ECU. The information on the update sequence in the specific example 1 defines the procedure of "pause activate" for the second type of target ECU. In accordance with this procedure, after the activation of the update software for the first type of target ECU is executed, the activation for the update software of the second type of target ECU is started. The activation is started all at once or in a predetermined order for all the second type of target ECUs. When the activation of the update software of the second type of target ECU is started, the process proceeds to step S909.

(Step S909) The OTA master 30 determines whether the activation of the update software of the second type of target ECU is completed. The completion of the activation is determined for all the second type of target ECUs. The OTA master 30 may determine the completion of the activation based on a completion notification from the second type of target ECU or after a predetermined time has elapsed from the start of the activation. The predetermined time may be set, for example, to be equal to or longer than a maximum time needed for each activation. When it is determined that the activation of the update software of the second type of target ECU is completed (step S909, yes), the installation and activation for all the target ECUs are completed, and the process ends.

In the specific example 1, the first type of target ECU and the second type of target ECU respectively proceed with the installation and activation processing according to a software update status of each other's target ECU. By this processing, for example, it is possible to first start the installation for the second type of target ECU that does not need stop control during the update, and after it is determined that the installation of the second type of target ECU is completed, start the installation for the first type of target ECU that needs the stop control during the update, and the like. Therefore, it is possible for the OTA master 30 to easily execute the software update processing suitable for each target ECU based on the information on the update sequence instructed from the center 10 by, for example, reducing the communication load on the inside of the in-vehicle network 90 and shorten a time needed for stopping the control of the vehicle until the completion of writing all the update software.

(3) Specific Example 2 of Installation and Activation

Figure 10A:
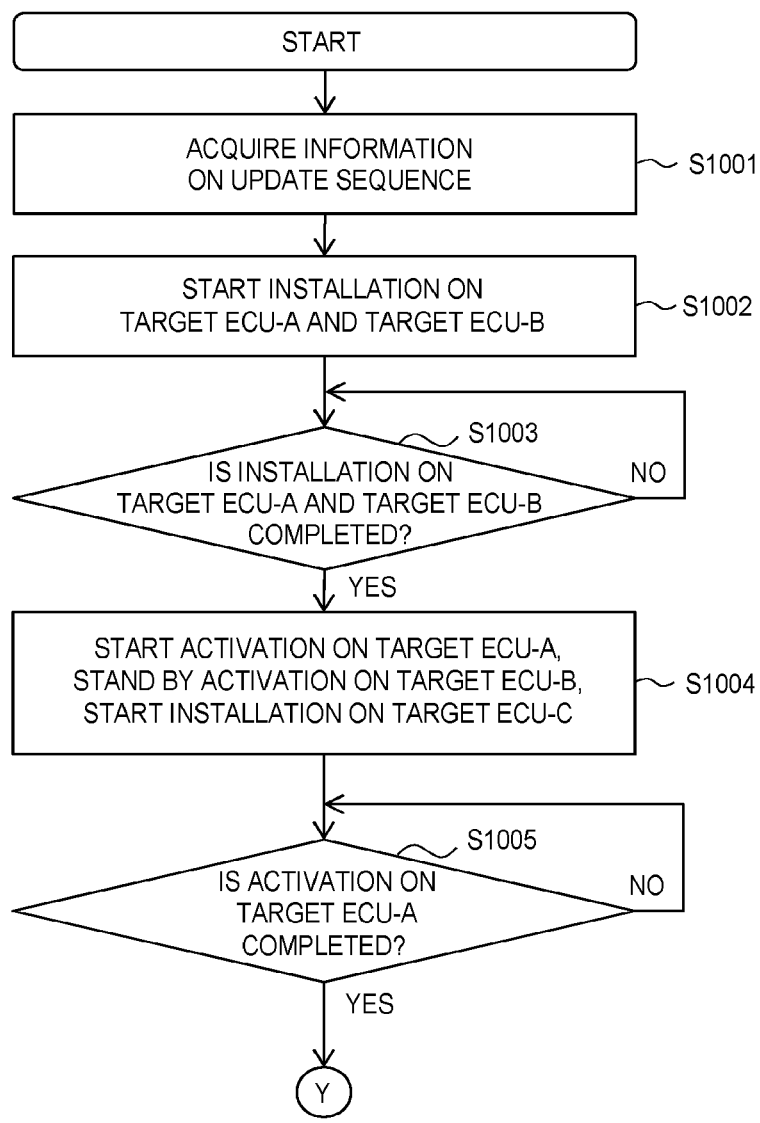
FIG. 10A is a flowchart of procedures of installation and activation processing according to a specific example 2 executed by the OTA master and the target ECU.
Figure 10B:
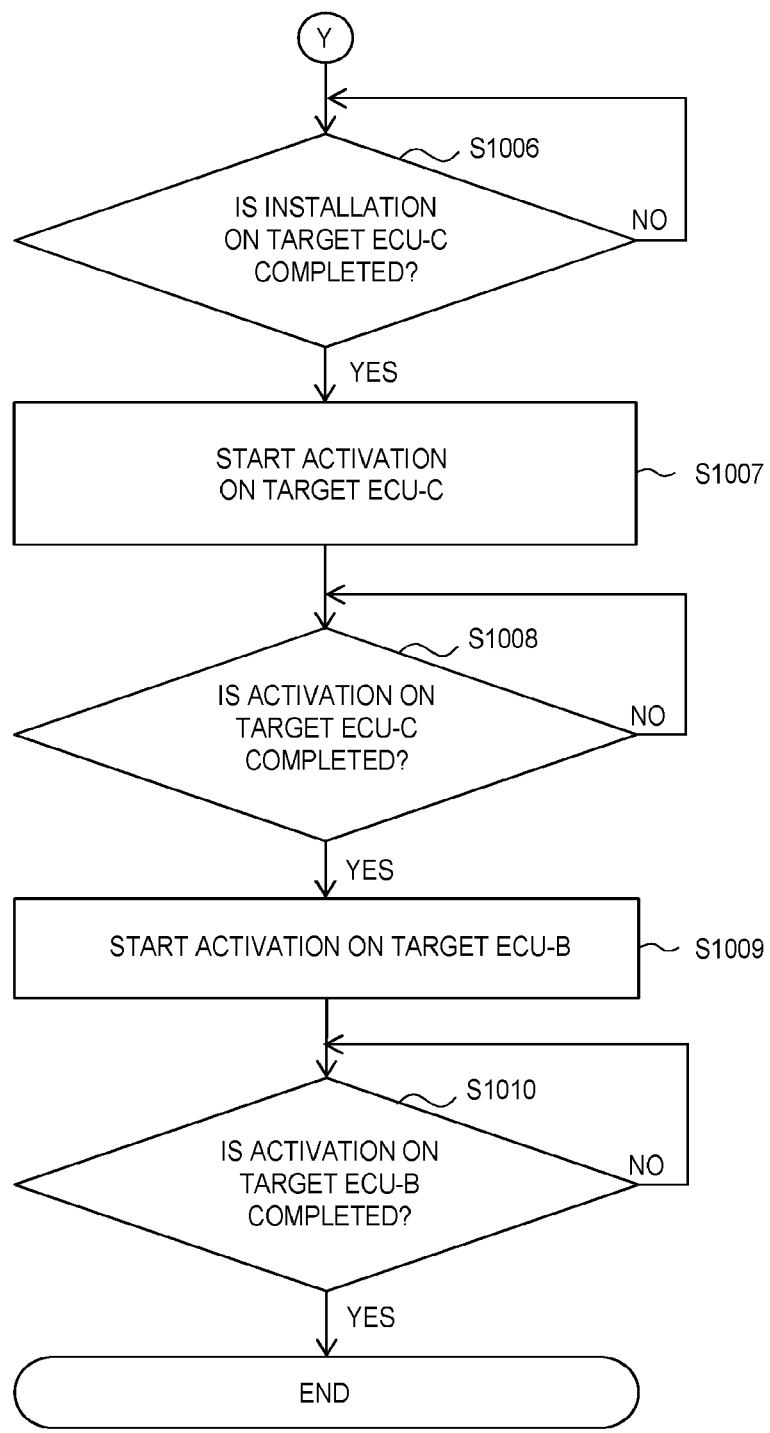
FIG. 10B is a flowchart of procedures of the installation and activation processing according to the specific example 2 executed by the OTA master and the target ECU.

FIGS. 10A and 10B are flowcharts describing procedures of the installation and activation processing executed by the OTA master 30 and the target ECUs according to a specific example 2. The processing of FIG. 10A and the processing of FIG. 10B are connected by a combiner Y.

In the specific example 2 illustrated in FIGS. 10A and 10B, an example of the information on the update sequence received by the OTA master 30 from the center 10 is described. In the example, the procedure of the software update processing suitable for each of the plurality of the target ECUs (-A, -B, -C) is defined regardless of the type of the non-volatile memory.

As the information on the update sequence of the specific example 2, the procedure of the software update processing for the target ECU-A, "verify the update data→install→activate"; the procedure of the software update processing for the target ECU-B, "verify the update data→install→pause→activate"; and the procedure of the software update processing for the target ECU-C, "verify the update data→pause→install→activate", are exemplified. Further, in addition to defining the procedure of the software update processing for each of the plurality of target ECUs (-A, -B, -C), the information on the update sequence may be information for giving an instruction on a relative priority in the procedure of the processing between the plurality of target ECUs, such as "verify each update data→install the target ECU-A, the target ECU-B activate the target ECU-A and install the target ECU-C→activate the target ECU-C→activate the target ECU-B".

The processing of the specific example 2 is started after the OTA master 30 completes the download of the distribution package containing the update data of the target ECU and the information on the update sequence, and when predetermined conditions (a possibility of the execution of the installation, OK in verification of the update data, and the like) are satisfied.

(Step S1001) The OTA master 30 acquires the information on the update sequence from the distribution package. When the information on the update sequence is acquired, the process proceeds to step S1002.

(Step S1002) The OTA master 30, the target ECU-A, and the target ECU-B start the installation, which is the processing for writing the update software on the storage area of the respective non-volatile memories of the target ECU-A and the target ECU-B, based on the update data and the information on the update sequence. The information on the update sequence of the specific example 2 defines the procedure of "verify the update data→install" for the target ECU-A, the procedure of "verify the update data→install" for the target ECU-B, and the procedure of "verify the update data→pause" for the target ECU-C, respectively. In accordance with these procedures, after the verification of each update data is executed, the installation is started with prioritizing the update software of the target ECU-A and the target ECU-B over the update software of the target ECU-C. The installation is started all at once or in a predetermined order for the target ECU-A and the target ECU-B. When the installation for the target ECU-A and the target ECU-B is started, the process proceeds to step S1003.

(Step S1003) The OTA master 30 determines whether the installation of the update software of the target ECU-A and the target ECU-B is completed. The OTA master 30 may determine the completion of the installation based on completion notifications from the target ECU-A and the target ECU-B or after a predetermined time has elapsed from the start of the installation. The predetermined time is set, for example, to be equal to or longer than a maximum time needed for each installation. When it is determined that the installation of the update software of the target ECU-A and the target ECU-B is completed (step S1003, yes), the process proceeds to step S1004.

(Step S1004) The OTA master 30 and the target ECU-A start the activation, which is the processing for making active the update software written on the storage area of the non-volatile memory of the target ECU-A, based on the update data and the information on the update sequence. Further, the OTA master 30 and the target ECU-C start the installation, which is the processing for writing the update software on the storage area of the non-volatile memory of the target ECU-C, based on the update data and the information on the update sequence. On the other hand, the OTA master 30 and the target ECU-B pause the activation, which is the processing for making active the update software written on the storage area of the non-volatile memory of the target ECU-B, based on the information on the update sequence. The information on the update sequence of the specific example 2 defines the procedure of "install→activate" for the target ECU-A, the procedure of "install→pause" for the target ECU-B, and the procedure of "pause→install" for the target ECU-C, respectively. In accordance with these procedures, after the installation of the update software for the target ECU-A and the target ECU-B is executed, the start of the activation of the update software of the target ECU-A and the installation of the update software of the target ECU-C are prioritized over the activation of the update software of the target ECU-B. When the activation for the target ECU-A and the installation for the target ECU-C are started, the process proceeds to step S1005.

(Step S1005) The OTA master 30 determines whether the activation of the update software of the target ECU-A is completed. The OTA master 30 may determine the completion of the activation based on a completion notification from the target ECU-A or after a predetermined time has elapsed from the start of the activation. The predetermined time may be set, for example, to be equal to or longer than a time needed for the activation. When it is determined that the activation of the update software of the target ECU-A is completed (step S1005, yes), the process proceeds to step S1006.

(Step S1006) The OTA master 30 determines whether the installation of the update software of the target ECU-C is completed. The OTA master 30 may determine the completion of the installation based on a completion notification from the target ECU-C or after a predetermined time has elapsed from the start of the installation. The predetermined time may be set, for example, to be equal to or longer than a time needed for the installation. When it is determined that the installation of the update software in the target ECU-C is completed (step S1006, yes), the process proceeds to step S1007.

(Step S1007) The OTA master 30 and the target ECU-C start the activation, which is the processing for making active the update software written on the storage area of the non-volatile memory of the target ECU-C. The information on the update sequence in the specific example 2 defines the procedure of "install→activate" for the target ECU-C, and the procedure of "pause→activate" for the target ECU-B, respectively. In accordance with these procedures, after the installation of the update software of the target ECU-C is executed, the start of the activation for the update software of the target ECU-C is prioritized over the activation of the update software of the target ECU-Bs. When the activation for the target ECU-C is started, the process proceeds to step S1008.

(Step S1008) The OTA master 30 determines whether the activation of the update software of the target ECU-C is completed. The OTA master 30 may determine the completion of the activation based on a completion notification from the target ECU-C or after a predetermined time has elapsed from the start of the activation. The predetermined time may be set, for example, to be equal to or longer than a time needed for the activation. When it is determined that the activation of the update software of the target ECU-C is completed (step S1008, yes), the process proceeds to step S1009.

(Step S1009) The OTA master 30 and the target ECU-B start the activation, which is the processing for making active the update software written on the storage area of the non-volatile memory of the target ECU-B. The information on the update sequence in the specific example 2 defines the procedure of "pause→activate" for the target ECU-B. In accordance with this procedure, after the activation of the update software for the target ECU-C is executed, the activation for the update software of the target ECU-B is started. When the activation of the update software for the target ECU-B is started, the process proceeds to step S1010.

(Step S1010) The OTA master 30 determines whether the activation of the update software of the target ECU-B is completed. The OTA master 30 may determine the completion of the activation based on a completion notification from the target ECU-B or after a predetermined time has elapsed from the start of the activation. The predetermined time may be set, for example, to be equal to or longer than a time needed for the activation. When it is determined that the activation of the update software of the target ECU-B is completed (step S1010, yes), the installation and activation for all the target ECUs are completed, and the process ends.

In the specific example 2, the target ECU-A independently executes the software update processing, and the target ECU-B and the target ECU-C proceed with the installation and activation processing according to the software update status of each other's target ECU. By this process, for example, it is possible to prioritize the execution of the installation of the update software of the target ECU-B in parallel with the software update processing of the target ECU-A over the installation of the update software of the target ECU-C. Therefore, the OTA master 30 can easily execute the software update processing suitable for each target ECU based on the information on the update sequence provided (instructed) from the center 10.

In the specific example 2, the determination of the completion of the installation of the update software of the target ECU-A (step S1003) or the determination of the completion of the activation (step S1005) may be executed after the determination of the completion of the installation of the update software of the target ECU-C (step S1006), or together with the determination of the completion of the activation of the update software of the target ECU-B (step S1010) or the determination of the completion of the activation of the update software of the target ECU-C (step S1008).

Further, in the specific example 2, as the information on the update sequence, an example in which the procedure of the software update processing suitable for each target ECU is defined regardless of the non-volatile memory type is described. However, the procedure of the software update processing suitable for each target ECU may be defined according to the non-volatile memory type. In other words, in addition to functions or performance of the target ECUs, the center 10 may further generate information on an update sequence suitable for the target ECU based on the type information of the non-volatile memories mounted on the target ECUs. In this case, for example, the center 10 may generate, for a single target ECU, two types of information on a procedure of software update processing applied to a specification of a single-bank memory and a procedure of software update processing applied to a specification of a dual-bank memory.

Action and Advantageous Effect

With the network system according to one embodiment of the present disclosure, the center transmits, to the OTA master, the software update data and the information on the update sequence defining the procedure of the software update processing. Then, the OTA master controls the update of the software of the ECUs based on update data of software received from the center and the information on the update sequence.

By this processing, the center can distribute the software update data to the vehicle and actively control the software update processing for the target ECUs in the vehicle by acting on the OTA master. On the other hand, the OTA master may only passively proceed with the software update processing of the target ECUs based on the instruction from the center, and thus it does not have to grasp the specifications of all the ECUs mounted on the vehicle at the time of the software update processing. Therefore, it is possible to reduce the burden on controlling the software update processing. For example, in a case where the non-volatile memory of the target ECU is changed from the single-bank memory to the dual-bank memory by replacement, once the center switches the information on the update sequence from the single-bank memory to the dual-bank memory and transmits it to the OTA master, the OTA master can execute the software update processing without any burden.

Although one embodiment of the technology of the present disclosure has been described above, the present disclosure can be regarded not only as the center, but also as a distribution method executed by the center that includes the processor and the memory, the distribution program, a computer-readable non-transitory storage program storing the distribution program, the OTA master communicable with the center, the system that includes the center and the OTA master, the vehicle that includes the OTA master, or the like.

The technology of the present disclosure can be used in a network system used for updating software of an electronic control unit.

What is claimed is:

1. A center apparatus disposed outside a vehicle and not included in the vehicle, the center apparatus comprising:
one or more processors configured to:
obtain update sequence information used to control a sequence of activation of software of a plurality of electronic control units mounted on the vehicle based on information obtained from the vehicle, the control of the sequence of activation being performed in accordance with a type of a storage area of a memory included in a distribution package, wherein the control of the sequence of activation is performed in accordance with whether the type of a storage area of the memory included in a distribution package is a single-bank memory or a dual-bank memory; and
transmit, to an over-the-air (OTA) master mounted on the vehicle, update data of the software of the plurality of electronic control units mounted on the vehicle and the obtained update sequence information,
wherein the OTA master includes one or more second processors configured to control the activation of the software,
wherein the one or more second processors are configured to:
verify the update data,
execute installation, and
execute activation.

2. The center apparatus according to claim 1, wherein:
the plurality of electronic control units include a first electronic control unit and a second electronic control unit;
the update data of the software includes first update data of software of the first electronic control unit on which a first type of non-volatile memory having one storage area is mounted and second update data of software of the second electronic control unit on which a second type of non-volatile memory having two storage areas is mounted; and
the update sequence information includes a procedure for updating the software of the first electronic control unit and a procedure for updating the software of the second electronic control unit.

3. The center apparatus according to claim 2, wherein, in the update sequence information, the procedure for updating the software of the first electronic control unit and the procedure for updating the software of the second electronic control unit differ from each other.

4. The center apparatus according to claim 1, wherein the update sequence information includes a procedure for updating software of each of the plurality of electronic control units.

5. The center apparatus according to claim 1, wherein the one or more processors are configured to transmit, to the OTA master, a distribution package containing the update data of the software and the update sequence information.

6. A system comprising:
a center apparatus disposed outside a vehicle and not included in the vehicle, the center apparatus including one or more first processors; and
an over-the-air (OTA) master including one or more second processors, wherein the one or more first processors are configured to:
obtain update sequence information used to control a sequence of activation of software of a plurality of electronic control units mounted on the vehicle based on information obtained from the vehicle, the control of the sequence of activation being performed in accordance with a type of a storage area of a memory included in a distribution package, wherein the control of the sequence of activation is performed in accordance with whether the type of a storage area of the memory included in a distribution package is a single-bank memory or a dual-bank memory, and
transmit, to an over-the-air (OTA) master mounted on the vehicle, update data of the software of the plurality of electronic control units mounted on the vehicle and the obtained update sequence information; and
the one or more second processors are configured to:
receive, from the center apparatus, the update data of the software and the update sequence information, and
control the activation of the software of the electronic control units based on the update data of the software and the update sequence information,
wherein the OTA master is configured to:
verify the update data,
execute installation, and
execute activation.

7. A distribution method executed by a center apparatus disposed outside a vehicle and not included in the vehicle, the center apparatus includes one or more processors and a memory, the distribution method comprising:
obtaining update sequence information used to control a sequence of activation of software of a plurality of electronic control units mounted on the vehicle based on information obtained from the vehicle, the control of the sequence of activation being performed in accordance with a type of a storage area of a memory included in a distribution package, wherein the control of the sequence of activation is performed in accordance with whether the type of a storage area of the memory included in a distribution package is a single-bank memory or a dual-bank memory; and
transmitting, to an over-the-air (OTA) master mounted on the vehicle, update data of the software of the plurality of electronic control units mounted on the vehicle and the obtained update sequence information,
wherein the OTA master is configured to control the activation of the software,
wherein the OTA master is further configured to:
verify the update data,
execute installation, and
execute activation.

* * * * *